(12) United States Patent
Ohta et al.

(10) Patent No.: US 11,292,729 B2
(45) Date of Patent: Apr. 5, 2022

(54) HYDROGEN-SUBSTITUTED GARNET-TYPE OXIDE, MANUFACTURING METHOD OF SINTERED BODY AND MANUFACTURING METHOD OF HYDROGEN-SUBSTITUTED GARNET-TYPE OXIDE

(71) Applicant: TOYOTA JIDOSHA KABUSHIKI KAISHA, Toyota (JP)

(72) Inventors: Shingo Ohta, Nagakute (JP); Masaki Watanabe, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 59 days.

(21) Appl. No.: 16/731,218

(22) Filed: Dec. 31, 2019

(65) Prior Publication Data

US 2020/0270143 A1 Aug. 27, 2020

(30) Foreign Application Priority Data

Feb. 21, 2019 (JP) .............................. JP2019-029579

(51) Int. Cl.
| | |
|---|---|
| *C01G 25/00* | (2006.01) |
| *C04B 35/488* | (2006.01) |
| *C04B 35/64* | (2006.01) |
| *H01M 10/0562* | (2010.01) |

(52) U.S. Cl.
CPC .......... *C01G 25/006* (2013.01); *C04B 35/488* (2013.01); *C04B 35/64* (2013.01); *H01M 10/0562* (2013.01); *C01P 2002/72* (2013.01); *C04B 2235/3203* (2013.01); *C04B 2235/3208* (2013.01); *C04B 2235/3217* (2013.01); *C04B 2235/3227* (2013.01); *C04B 2235/656* (2013.01); *C04B 2235/764* (2013.01); *C04B 2235/77* (2013.01); *H01M 2300/0077* (2013.01)

(58) Field of Classification Search
CPC ..... C01G 25/006; C04B 35/488; C04B 35/64; C04B 2235/3203; C04B 2235/3208; C04B 2235/3217; C04B 2235/3227; C04B 2235/656; C04B 2235/764; C04B 2235/77; H01M 10/0562; H01M 2300/0077; C01P 2002/72
See application file for complete search history.

(56) References Cited

U.S. PATENT DOCUMENTS

| | | | |
|---|---|---|---|
| 2017/0346092 A1* | 11/2017 | Yada | ................. H01M 10/0585 |
| 2019/0088993 A1 | 3/2019 | Ohta | |
| 2019/0148770 A1 | 5/2019 | Badding et al. | |

(Continued)

FOREIGN PATENT DOCUMENTS

| | | |
|---|---|---|
| CN | 109534813 A | 3/2019 |
| JP | 2011-070939 A | 4/2011 |

(Continued)

OTHER PUBLICATIONS

JP2012096940 translation (Year: 2012).*

(Continued)

*Primary Examiner* — Karl E Group
*Assistant Examiner* — Cameron K Miller
(74) *Attorney, Agent, or Firm* — Oliff PLC

(57) ABSTRACT

There is provided a hydrogen-substituted garnet-type oxide containing at least Li, H, La and Zr and has an amount of hydrogen a (moll unit) per one unit of a garnet-type oxide in a range of ≤1.85.

9 Claims, 4 Drawing Sheets

(56) References Cited

U.S. PATENT DOCUMENTS

2020/0227775 A1\* 7/2020 Wang .................. C04B 35/486
2021/0119251 A1\* 4/2021 Niwa ................ H01M 10/0562

FOREIGN PATENT DOCUMENTS

| JP | 2012-096940 A | | 5/2012 |
|----|---------------|---|--------|
| JP | 2012096940 | \* | 5/2012 |
| JP | 2013-037992 A | | 2/2013 |
| JP | 2017-216222 A | | 12/2017 |
| JP | 2018-502809 A | | 2/2018 |

OTHER PUBLICATIONS

Lee, Chul-Ho et al. "Low temperature synthesis of garnet type solid electrolyte by modified polymer complex process and its characterization". Materials Research Bulletin, vol. 83, pp. 309-315, 2016.

\* cited by examiner

HYDROGEN-SUBSTITUTED GARNET-TYPE OXIDE, MANUFACTURING METHOD OF SINTERED BODY AND MANUFACTURING METHOD OF HYDROGEN-SUBSTITUTED GARNET-TYPE OXIDE

The present disclosure claims priority to Japanese Patent Application No. 2019-029579 filed Feb. 21, 2019, which is incorporated herein by reference in its entirety including specification, drawings and claims.

TECHNICAL FIELD

A hydrogen-substituted garnet-type oxide, a manufacturing method of a sintered body and a manufacturing method of the hydrogen-substituted garnet-type oxide are disclosed herein.

BACKGROUND

A garnet-type ion conductive oxide including Li, La and Zr and showing ion conductivity has been proposed as a solid electrolyte (as described in, for example, a non-patent literature, Materials Research Bulletin, 83 (2016), 309-315). According to this non-patent literature, $Li_7La_3Zr_2O_{12}$ sintered at 700° C. is tetragonal and has a conductivity of $6.2 \times 10^{-7}$ S/cm and $Li_7La_3Zr_2O_{12}$ sintered at 1100° C. is cubic and has a conductivity of $1.4 \times 10^{-4}$ (S/cm).

SUMMARY

The technique of this non-patent literature, however, still has a problem that sintering at the lower temperature, for example, a temperature of not higher than 1000° C. reduces the conductivity. There is accordingly a demand for further increasing the conductivity as well as enhancing the sinterability, for example, by sintering at the lower temperature.

By taking into account the problem described above, a main object of the present disclosure is to provide a hydrogen-substituted garnet-type oxide that further enhances the sinterability and further increases the conductivity, a manufacturing method of a sintered body, and a manufacturing method of the hydrogen-substituted garnet-type oxide.

As the results of intensive studies with a view to achieving the object described above, the inventors have found that substitution of Li of the garnet-type oxide with hydrogen enhances the sinterability and the crystallinity and thereby increases the conductivity and have accordingly completed the disclosure of the present application.

A hydrogen-substituted garnet-type oxide according to the aspect of the present disclosure includes at least Li, H, La and Zr and has an amount of hydrogen a (mol/unit) per one unit of a garnet-type oxide in a range of $0 < a \leq 1.85$.

A manufacturing method of a sintered body according to another aspect of the present disclosure is a manufacturing method of a sintered body including a garnet-type oxide. The manufacturing method of the sintered body includes a molding process of mixing the hydrogen-substituted garnet-type oxide according to claim 1 with a Li compound having an equivalent amount of Li to an amount of hydrogen included in the hydrogen-substituted garnet-type oxide to obtain a mixture and molding the mixture to form a molded body and a sintering process of sintering the molded body in a temperature range of not lower than 800° C. and not higher than 1200° C., so as to provide a sintered body including a garnet-type oxide that has a half-height width of not larger than 0.17 degrees with regard to 421-diffraction having a peak in a 2θ range of not smaller than 30.5 degrees and not larger than 31.0 degrees in X-ray diffraction analysis.

A manufacturing method of a hydrogen-substituted garnet-type oxide according to another aspect of the present disclosure includes a firing process including at least a first process that uses and mixes a raw material including at least a Li compound, a La compound and a Zr compound and fires the mixed raw material in a temperature range of not lower than 650° C. and not higher than 900° C. to obtain a fired powdery substance and a second process that adds and mixes, as appropriate, a Li compound to and with the obtained fired powdery substance to obtain a mixture and fires the mixture in a temperature range of not lower than 650° C. and not higher than 900° C. to obtain a fired powdery substance and a hydrogen substitution process of causing the fired powdery substance obtained by the firing process to be immersed in a hydrogen-containing liquid for substitution of Li with H, so as to obtain the hydrogen-substituted garnet-type oxide.

The hydrogen-substituted garnet-type oxide, the manufacturing method of the sintered body and the manufacturing method of the hydrogen-substituted garnet-type oxide according to the aspects of the present disclosure effectively enhance the sinterability and increase the conductivity. Such advantageous effects may be attributed to the following reasons. A Li compound, a La compound and a Zr compound are generally used as the starting materials for synthesis of a garnet-type oxide including Li, La and Zr. A presumed sintering mechanism of the garnet-type oxide first causes La and Zr to react with each other at a temperature of about 600° C. and thereby produces a pyrochlore-type oxide, $La_2Zr_2O_7$. The remaining elements are expected to be dissolved in this oxide to start transformation into a garnet-type oxide at a temperature of about 700° C. Sintering is thought to be accelerated by diffusion of Li at a temperature of about 900° C. It is difficult to perform sintering and densification of the garnet-type oxide at a firing temperature of, for example, not higher than 1000° C. when the Li compound, the La compound and the Zr compound are used as the starting materials. The inventors of the present application have employed a different approach that substitutes part of Li with hydrogen and takes advantage of element diffusion by insertion and release of hydrogen to accelerate densification of the sintered body. Hydrogen substitution improves the sinterability of the garnet-type oxide. Increasing the substitution amount of hydrogen is, on the other hand, likely to reduce the crystallinity and accordingly reduce the ion conductivity. The above aspects of the present disclosure optimize the crystallinity, the upper limit of the substitution amount of hydrogen and the like, based on the finding that there are correlations of the ion conductivity and the crystallinity with the substitution amount of hydrogen. Such optimization of the crystallinity, the upper limit of the substitution amount of hydrogen and the like further enhances the sinterability and further increases the conductivity.

BRIEF DESCRIPTION OF DRAWINGS

FIG. 2 is a relationship diagram illustrating relative density against the amount of hydrogen a;

DESCRIPTION OF EMBODIMENTS

Figure 1:
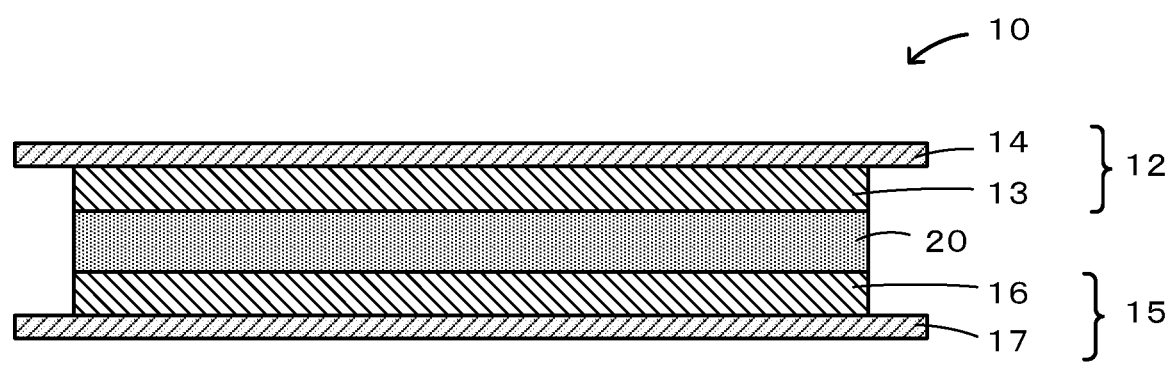
FIG. 1 is a diagram illustrating one example of the configuration of a lithium battery 10.

The hydrogen-substituted garnet-type oxide The hydrogen-substituted garnet-type oxide according to the aspects of the present disclosure includes at least Li, H, La and Zr and has an amount of hydrogen a (mol/unit) per one unit of a garnet-type oxide in a range of $0 < a \leq 1.85$. One unit herein denotes one structural unit (1 mol) of $Li_7La_3Zr_2O_{12}$. This hydrogen-substituted garnet-type oxide is used as a raw material of a sintered body that is a dense body comprised of a garnet-type oxide. The hydrogen-substituted garnet-type oxide may be expressed by an elemental composition $(Li_{7-a-3b+c-d}, H_a, M_b)(La_{3-c}, A_c)(Zr_{2-d}, T_d)O_{12}$ (where M denotes one or more elements out of Al, Ga and Fe, A denotes one or more elements out of Ca and Sr and T denotes one or more elements out of Nb and Ta. The amount of hydrogen a (mol/unit) per one unit of the garnet-type oxide is in the range of $0 < a \leq 1.85$, $0 \leq b \leq 0.22$, $0 \leq c \leq 1.0$, and $0 \leq d \leq 0.6$). This amount of hydrogen a is preferably equal to or larger than 0.5 (mol/unit) and is more preferably equal to or larger than 0.7 (mol/unit). This amount of hydrogen a is also preferably equal to or smaller than 1.6 (mol/unit) and is more preferably equal to or smaller than 1.5 (mol/unit). The amount of hydrogen a in this range enhances the sinterability and thereby further enhances the relative density. In the hydrogen-substituted garnet-type oxide, the element M is preferably Al, the element A is preferably Ca, and the element T is preferably Nb.

The Manufacturing Method of the Hydrogen-Substituted Garnet-Type Oxide

A manufacturing method of the hydrogen-substituted garnet-type oxide according to another aspect of the present disclosure may include, for example, a firing process of mixing a raw material and firing the mixed raw material to obtain a fired powdery substance and a hydrogen substitution process of causing the obtained fired powdery substance to be subjected to hydrogen substitution.

The firing process may include at least a first process that uses and mixes a raw material including at least a Li compound, a La compound and a Zr compound and fires the mixed raw material in a temperature range of not lower than 650° C. and not higher than 900° C. to obtain a fired powdery substance; and a second process that adds and mixes, as appropriate, a Li compound to and with the obtained fired powdery substance to obtain a mixture and fires the mixture in a temperature range of not lower than 650° C. and not higher than 900° C. to obtain a fired powdery substance. This firing process may further include a plurality of additional processes as needed basis, for example, a third process and a fourth process of further adding and mixing the Li compound to and with the fired powdery substance and firing the mixture. The Li compound included in this raw material may be, for example, lithium hydroxide, lithium carbonate or lithium oxide. Similarly, each of the La compound and the Zr compound may be provided in the form of a hydroxide, a carbonate or an oxide. The raw material may further include, for example, an added compound containing one or more elements out of Al, Ga and Fe, an added compound containing one or more elements out of Ca and Sr, and an added compound containing one or more elements out of Nb and Ta. Each of these added compounds may also be provided in the form of a hydroxide, a carbonate or or an oxide. The respective compounds of the raw material may be mixed, such as to provide a product that is expressed by an elemental composition $(Li_{7-3b+c-d}, M_b)(La_{3-c}A_c)(Zr_{2-d}T_d)O_{12}$ (where M denotes one or more elements out of Al, Ga and Fe; A denotes one or more elements out of Ca and Sr; and T denotes one or more elements out of Nb and Ta, wherein $0 \leq b \leq 0.22$, $0 \leq c \leq 1.0$, and $0 \leq d \leq 0.6$).

The raw material is preferably mixed by a crushing/mixing technique using, for example, a ball mill or a planetary mill. A more preferable technique of mixing is wet mixing in a solvent such as an alcohol. The firing process may be performed in the atmosphere. The firing temperature is preferably not lower than 650° C. to suppress the unreacted raw material from being left and is preferably not higher than 900° C. to further suppress the particles from coarsening due to a start of liquid phase sintering. This firing temperature is more preferably in a range of not lower than 700° C. and not higher than 800° C. The firing time is preferably in a range of not shorter than 12 hours and not longer than 72 hours and is more preferably in a range of not shorter than 16 hours and not longer than 48 hours. The firing time of not shorter than 12 hours further suppresses the unreacted raw material from being left. The firing time of not longer than 72 hours further reduces the energy consumption.

The hydrogen substitution process causes the fired powdery substance obtained by the firing process to be immersed in a hydrogen-containing liquid, so as to substitute Li with H and provide the hydrogen-substituted garnet-type oxide described above. The hydrogen-containing liquid may be, for example, an acid solution or water. It is more preferable to use water as the hydrogen-containing liquid. A container used in the hydrogen substitution process is preferably a container having alkali resistance, for example, a container made of polytetrafluoroethylene. This is because hydrogen substitution produces LiOH. In this process, the immersion time in the immersion process of the fired powdery substance may be in a range of not shorter than 3 minutes and not longer than 30 minutes. The substitution amount of hydrogen a is adjustable by regulating this immersion time. The hydrogen substitution process may use, for example, an ultrasonic vibrator. Using the ultrasonic vibrator accelerates hydrogen substitution and shortens the time required for hydrogen substitution. The substitution amount of hydrogen a is adjustable by selecting one of a plurality of procedures of the hydrogen substitution process, i.e., a short time process without using the ultrasonic vibrator, a short time process with using the ultrasonic vibrator, a long time process without using the ultrasonic vibrator and a long time process with using the ultrasonic vibrator. The hydrogen substitution process may dry the obtained hydrogen-substituted garnet-type oxide after this immersion process and additionally perform another immersion process, in order to further increase the amount of hydrogen a. A preferable technique employed to collect the powder after the immersion process is filtration under reduced pressure by using, for example, a membrane filter. This effectively shortens the drying time. The collected powder may be dried by using a dryer. The powder of the hydrogen-substituted garnet-type oxide is obtained by the procedure described above.

The Manufacturing Method of the Sintered Body

A manufacturing method of a sintered body according to another aspect of the present disclosure is a manufacturing method of a sintered body including a garnet-type oxide and includes a molding process and a sintering process. The molding process mixes the hydrogen-substituted garnet-type oxide described above with a Li compound having an equivalent amount of Li to an amount of hydrogen included in the hydrogen-substituted garnet-type oxide to obtain a mixture and molds the mixture to form a molded body. Mixing an "equivalent amount" of Li herein means adding an identical molar amount of Li, but a slight difference in amount to be added is acceptable. Like the raw material of the hydrogen-substituted garnet-type oxide described above, the raw material may be mixed, such as to provide a product that is expressed by an elemental composition ($Li_{7-3b+c-d}$, $M_b$)($La_{3-c}A_c$)($Zr_{2-d}T_d$)$O_{12}$ (where M denotes one or more elements out of Al, Ga and Fe; A denotes one or more elements out of Ca and Sr; and T denotes one or more elements out of Nb and Ta, wherein $0 \leq b \leq 0.22$, $0 \leq c \leq 1.0$, and $0 \leq d \leq 0.6$). The raw material may further include, for example, an added compound containing one or more elements out of Al, Ga and Fe, an added compound containing one or more elements out of Ca and Sr, and an added compound containing one or more elements out of Nb and Ta, in addition to the hydrogen-substituted garnet-type oxide. A die or a mold may be used in the molding process. The amount of pressurization in the molding process may be set appropriately according to the shape and the size of the molded body and may be, for example, in a range of not lower than 1 MPa and not higher than 100 MPa or in a range of not lower than 5 MPa and not higher than 20 MPa. The shape of the molded body is not specifically limited, but the molded body may have any shape.

The sintering process sinters the molded body formed by the molding process in a temperature range of not lower than 800° C. and not higher than 1200° C., so as to provide a sintered body including a garnet-type oxide that has a half-height width of not larger than 0.17 degrees with regard to 421-diffraction having a peak in a 2θ range of not smaller than 30.5 degrees and not larger than 31.0 degrees in X-ray diffraction analysis. The sintering process may be performed in the atmosphere. A pressure sintering technique (for example, HIP) may be employed for the sintering process, but the sintering process performed in the atmosphere is simpler and thereby more preferable. The firing temperature of not lower than 800° C. achieves sintering. The firing temperature of not higher than 1200° C. is preferable, since this temperature range effectively suppresses vaporization and release of Li and the like. The melting point of the garnet-type oxide is 1300° C., so that the temperature of higher than 1300° C. is undesirable.

The Sintered Body

The sintered body obtained by the manufacturing method described above may be expressed by an elemental composition ($Li_{7-3b+c-d}$, $M_b$)($La_{3-c}A_c$)($Zr_{2-d}T_d$)$O_{12}$ (where M denotes one or more elements out of Al, Ga and Fe; A denotes one or more elements out of Ca and Sr; and T denotes one or more elements out of Nb and Ta, wherein $0 \leq b \leq 0.22$, $0 \leq c \leq 1.0$, and $0 \leq d \leq 0.6$). The sintered body may include hydrogen, but it is more preferable that the sintered body does not include hydrogen. This sintered body preferably has a half-height width in a range of not smaller than 0.08 degrees and not larger than 0.16 degrees with regard to 421-diffraction in X-ray diffraction analysis. The sintered body having the half-height width in this range has the further enhanced sinterability and the further increased conductivity.

This sintered body preferably has a relative density of not lower than 90%. The higher relative density is more preferable. Furthermore, this sintered body preferably has a conductivity of not lower than $1.0 \times 10^{-4}$ (S/cm) at ambient temperature (25° C.). The higher conductivity is more preferable. With regard to the garnet-type oxide containing Li, La and Zr, the electrical conductivity indicates the ion conductivity. This sintered body has ion conductivity and may thus be applied for, for example, solid electrolytes and separators.

FIG. 1 is a diagram illustrating one example of the configuration of a lithium battery 10. This lithium battery 10 includes a positive electrode 12, a negative electrode 15 and a solid electrolyte layer 20. The positive electrode 12 includes a positive electrode active material layer 13 and a current collector 14. The negative electrode 15 includes a negative electrode active material layer 16 and a current collector 17. The solid electrolyte layer 20 is the sintered body described above and is comprised of a garnet-type oxide containing at least Li, La and Zr.

The hydrogen-substituted garnet-type oxide, the manufacturing method of the sintered body and the manufacturing method of the hydrogen-substituted garnet-type oxide described above in detail effectively enhance the sinterability and increase the conductivity. Such advantageous effects may be attributed to the following reasons. For example, when the raw material used is a hydrogen-substituted garnet-type oxide with part of Li substituted by hydrogen, densification of the sintered body is accelerated by taking advantage of element diffusion by insertion and release of hydrogen. Hydrogen substitution improves the sinterability and increases the relative density of the garnet-type oxide. Increasing the substitution amount of hydrogen, on the other hand, reduces the crystallinity and accordingly reduces the ion conductivity. The above aspects of the present disclosure optimize the crystallinity, the upper limit of the substitution amount of hydrogen and the like, based on the finding that there are correlations of the ion conductivity and the crystallinity with the substitution amount of hydrogen. Such optimization provides the high conductivity even at the decreased sintering temperature.

The present disclosure is not limited to the aspects or the embodiments described above but may be implemented by any of various other aspects within the scope of the present disclosure.

EXAMPLES

The following describes concrete examples of manufacturing the garnet-type oxide according to the present disclosure as Experimental Examples. Experimental Examples 1, 13, 16, 18, 19 and 21 to 26 are comparative examples, and Experimental Examples 2 to 12, 14, 15, 17 and 20 are examples according to the present disclosure.

Preparation of Hydrogen-Substituted Garnet-Type Oxide ($Li_{6.8}$)($La_{2.95}Ca_{0.05}$)($Zr_{1.75}Nb_{0.25}$)$O_{12}$ (LLZ-CN) without including hydrogen was prepared in the form of solid electrolyte particles. Starting materials used were LiOH ($H_2O$) (manufactured by Sigma-Aldrich), La(OH)$_3$ (manufactured by Kojundo Chemical Laboratory Co., Ltd.), Ca(OH)$_2$ (manufactured by Kojundo Chemical Laboratory Co., Ltd.), ZrO$_2$ (manufactured by Kojundo Chemical Laboratory Co., Ltd.) and Nb$_2$O$_5$ (manufactured by Kojundo Chemical Laboratory Co., Ltd.) These starting materials were weighed to achieve a stoichiometric ratio, were mixed and were pulverized. A vessel made of zirconia and a ball made of zirconia were used for mixing and pulverization. The starting materials were mixed and pulverized in ethanol at 180 rpm for one hour and subsequently at 300 rpm for one hour by using a planetary ball mill P-6 (manufactured by Fritsch) and were further mixed and pulverized at 700 rpm for one hour by using a premium line P-7 (manufactured by Fritsch). The pulverized substance obtained after the pulverization was dried at 80° C. by a dryer. The obtained powdery substance was placed in an Au crucible and was preliminarily fired in the atmosphere at 700° C. for 48 hours. After preliminary firing, LiOH(H$_2$O) was added to the preliminary fired powdery substance to be 10 at % excess relative to Li in the composition with a view to compensating for the loss of Li in the sintering process. The resulting mixture was then mixed and pulverized again under the same conditions as those described above and was preliminary fired again (at 700° C. for 10 hours). It was then confirmed that unreacted raw material did not remain in the powdery substance preliminarily fired twice as described above by XRD identification of a crystalline phase. The obtained powder of LLZ-CN was immersed in water for exchange between Li and H. The conditions of immersion for exchange between Li and H were: LLZ-CN was immersed in water at a ratio of 3 g of LLZ-CN to 50 mL of water and stood still at ambient temperature (around 25° C.) for 3 to 30 minutes. The substitution amount of H is controllable by regulating this standing time. For example, the substitution amount a of H was about 0.9 (mol/unit) by standing for about 3 minutes and was about 1.6 (mol/unit) by standing for about 30 minutes. When it was required to increase the the substitution amount a of H to be equal to or larger than 1.6 (mol/unit), the substitution amount a of H was increased by performing substitution again after collection of the hydrogen-substituted LLZ. The H-substituted product was collected by filtration under reduced pressure by using a membrane filter having a recovery particle size of 300 nm. A hydrogen-substituted garnet-type oxide (LLZ-HCN) was obtained by drying the collected product at 80° C. by a dryer. The powdery substance without hydrogen substitution was specified as Experimental Example 1, and the products with the increasing substitution amounts of hydrogen were used as the raw materials (hydrogen-substituted garnet-type oxides) of sintered bodies of Experimental Examples 2 to 26.

Determination of H Amount

The amount of hydrogen a in each of the hydrogen-substituted garnet-type oxides prepared as described above was determined by a procedure described below. The procedure loaded the H-substituted powder in a TG-DTA mass spectrometer (manufactured by Rigaku Corporation), specified a temperature range of vaporization and release of H$_2$O (molecular weight of 18) by mass spectrometry, and determined an amount of mass decrease in the specified temperature range by thermogravimetry (TG).

The specified temperature range was a range of about 350 to 450° C. The amount of hydrogen atoms (the amount of hydrogen a) included in one unit of LLZ-HCN was calculated from the mass and the molecular weight of LLZ-CN, the mass of vaporized and released water and the molecular weight of water.

Production of Sintered Body

LiOH(H$_2$O) having an equivalent molar amount of Li to a molar amount of H included in LLZ-HCN prepared as described above was weighed and was dry blended with the LLZ-HCN powder. This powdery mixture was pressurized in a mold at 10 MPa for about 2 minutes, so that a molded product was obtained in the form of a pellet. The molded product in the form of a pellet was sintered in a temperature range of not lower than 800° C. and lower than 1300° C.

X-Ray Diffraction Analysis

The obtained sintered body was measured by X-ray diffraction analysis. An XRD apparatus smart-Lab (manufactured by Rigaku Corporation) was used for this measurement. The measurement was performed in a 2θ range of 10 to 80 degrees at every 0.01-degree step by using a Cu X-ray tube. A half-height width of a diffraction peak was calculated by using analysis software manufactured by Rigaku Corporation. A function, Pearson-VII, was used for the calculation. The half-height width of a 421-diffraction peak, i.e., the maximum diffraction peak of the garnet-type oxide, was calculated.

Measurement of Conductivity

Au electrodes were welded to respective faces of the pellet of the sintered body produced as described above. Au paste (manufactured by Tanaka Kikinzoku Kogyo K.K) was used for the measurement. The welding temperature was 750° C., and the welding time was 30 minutes. An AC impedance analyzer 42941A (manufactured by Agilent Technologies) was used for measurement of the conductivity.

Results of Discussion

Figure 2:
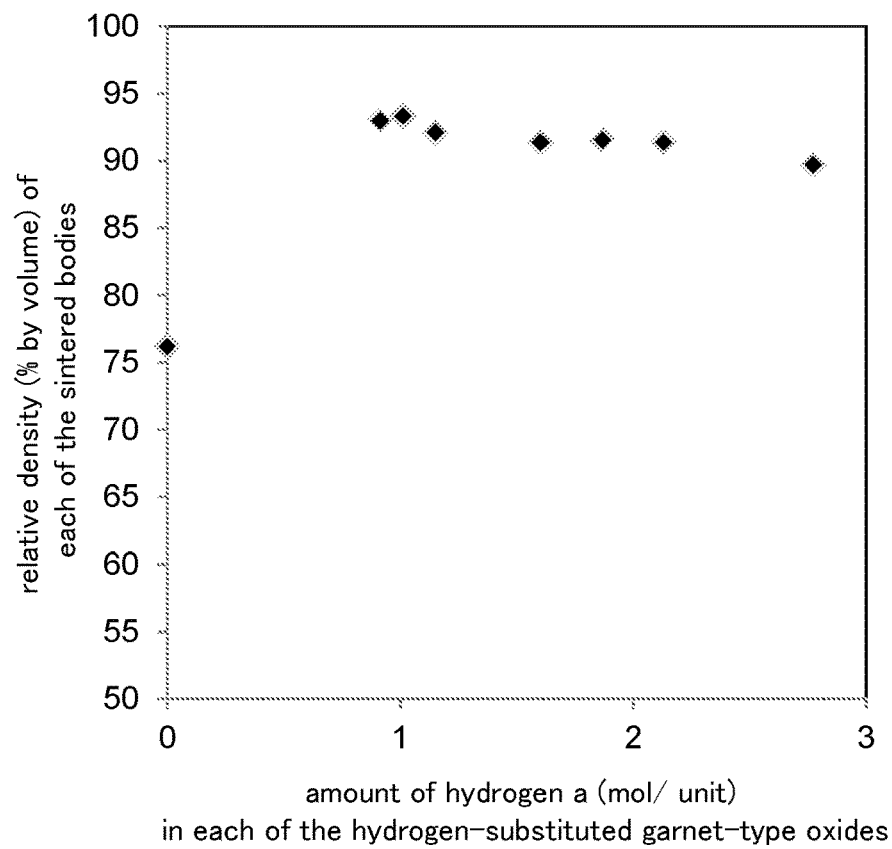
Figure 3:
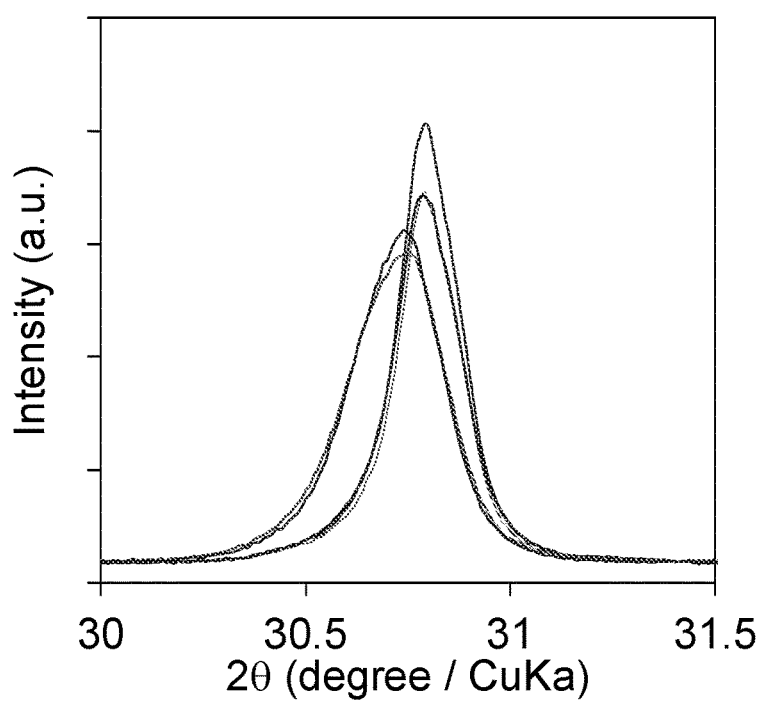
FIG. 3 is a diagram illustrating 421-diffraction peaks and their half-height widths.
Figure 4:
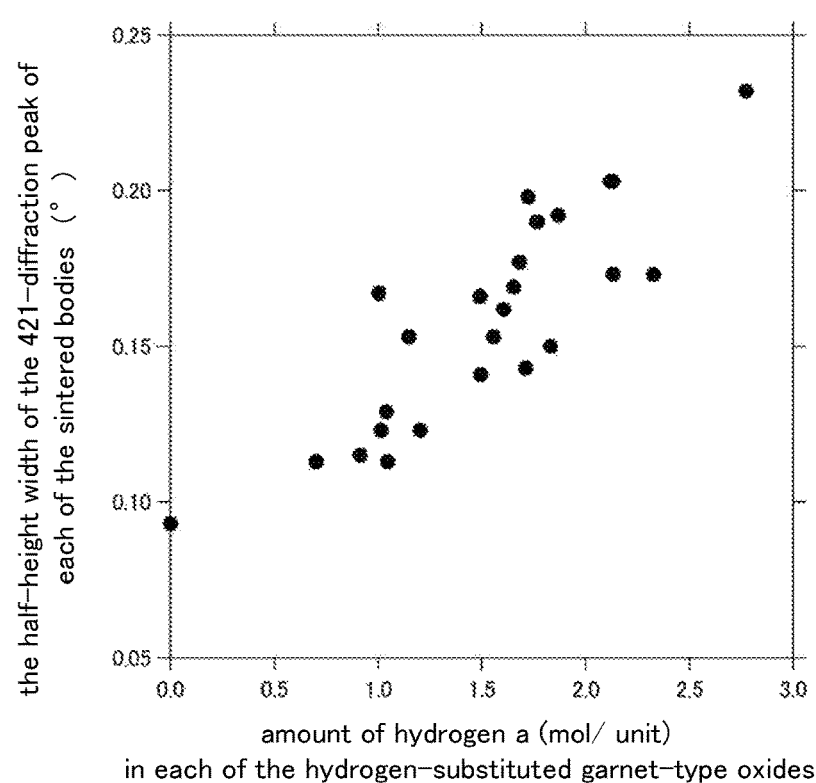
FIG. 4 is a relation diagram illustrating half-height width of a 421-diffraction peak of each of the sintered bodies against the amount of hydrogen a as the raw materials.
Figure 5:
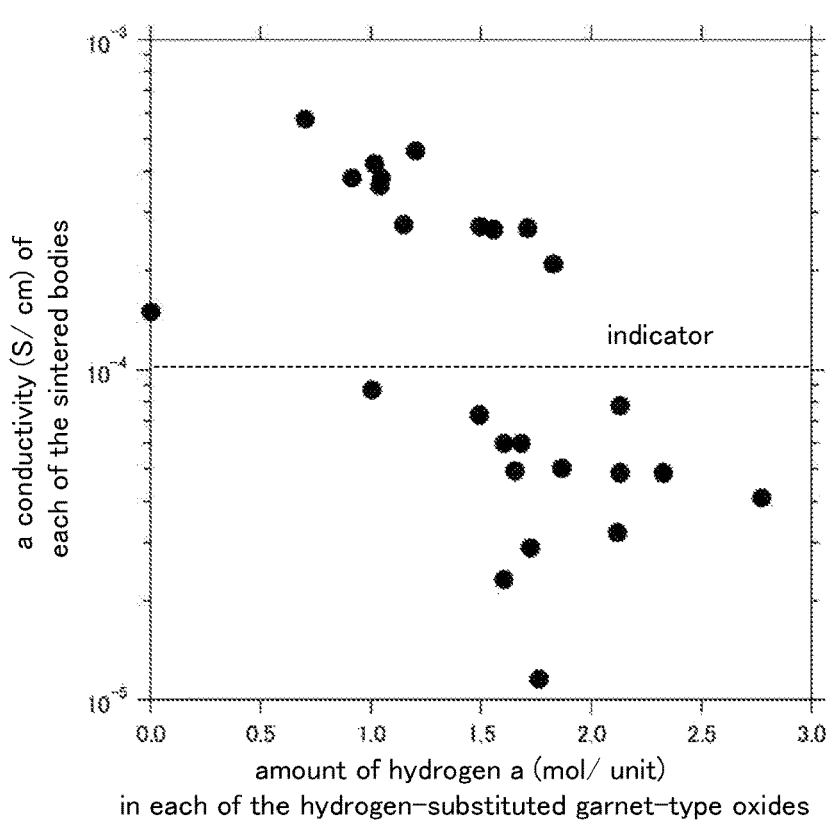
FIG. 5 is a relation diagram illustrating conductivity of each of the sintered bodies against the amount of hydrogen a as the raw materials.
Figure 6:
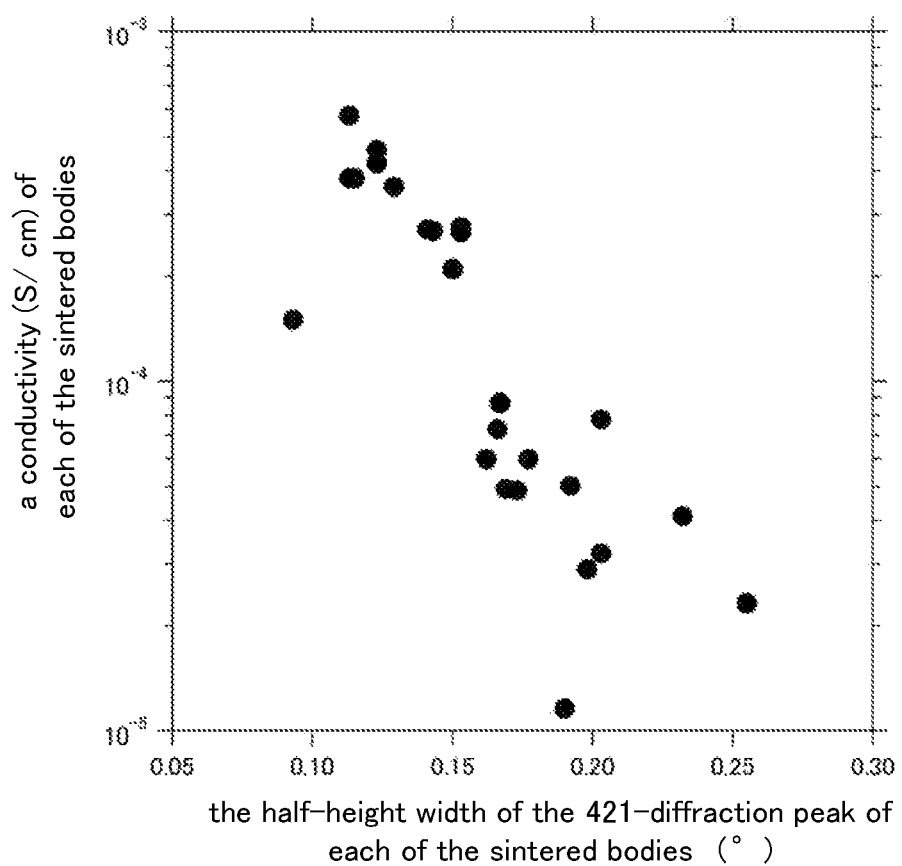
FIG. 6 is a relation diagram illustrating conductivity of each of the sintered bodies against the half-height width of a 421-diffraction peak of each of the sintered bodies.

Table 1 summarizes the amount of hydrogen a (mol/unit) in each of the hydrogen-substituted garnet-type oxides used as the raw materials of the sintered bodies, the half-height width (degrees) of a 421-diffraction peak of each of the sintered bodies, the conductivity (s/cm) at 25° C., the relative density (% by volume) of each of the sintered bodies. FIG. 2 is a relationship diagram illustrating a variation in relative density (% by volume) of each of the sintered bodies against the amount of hydrogen a (mol/unit) in each of the hydrogen-substituted garnet-type oxides. FIG. 3 is a diagram illustrating 421-diffraction peaks and their half-height widths with regard to the results of XRD analysis. FIG. 4 is a relation diagram illustrating a variation in half-height width (degrees) of a 421-diffraction peak of each of the sintered bodies against the amount of hydrogen a (mol/unit) in each of the hydrogen-substituted garnet-type oxides used as the raw materials. FIG. 5 is a relation diagram illustrating a variation in conductivity (S/cm) of each of the sintered bodies against the amount of hydrogen a (mol/unit) in each of the hydrogen-substituted garnet-type oxides used as the raw materials. FIG. 6 is a relation diagram illustrating a variation in conductivity (S/cm) of each of the sintered bodies against the half-height width (degrees) of a 421-diffraction peak of each of the sintered bodies. FIGS. 2 to 6 summarize the data of Experimental Examples 1 to 26 shown in Table 1.

As shown in FIG. 2, the sintered bodies produced by using the hydrogen-substituted garnet-type oxides as the raw materials had the relative densities of not lower than 90% by volume. These results indicate the higher sinterability, compared with the sinterability of the non-hydrogen-substituted garnet-type oxide. The garnet-type oxide without including hydrogen like Experimental Example 1 does not include any diffusion element that diffuses in the sintering process, whereas the hydrogen-substituted garnet-type oxide includes hydrogen as the diffusion element. Including hydrogen enhances the sinterability accompanied with diffusion of hydrogen. As shown in FIG. 3, the half-height width of the 421-diffraction peak of each of the sintered bodies produced by using the hydrogen-substituted garnet-type oxides as the raw materials tends to increase with an increase in amount of hydrogen a. In other words, an increase in the amount of hydrogen a reduces the crystallinity of the garnet-type oxide of the sintered body. The reduction of the crystallinity is expected to reduce the ion conductivity. As shown in FIG. 4, one of the amount of hydrogen a and the half-height width of the 421-diffraction peak tends to increase with an increase of the other. Their relationship is not a strict linear relationship but is rather a rough relationship. There is no clear correlation between the amount of hydrogen a in the hydrogen-substituted garnet-type oxide and the conductivity of the sintered body as shown in FIG. 5. There is, on the other hand, a clear correlation between the half-height width of the 421-diffraction peak of the sintered body and the conductivity of the sintered body as shown in FIG. 6. More specifically, the results of FIG. 6 indicate the higher conductivity in a range of the half-height width of not larger than 0.17 degrees and more preferably the conductivity of not lower than 1×

$10^{-4}$ (S/cm) in a range of the half-height width of not smaller than 0.08 degrees and not larger than 0.16 degrees. As shown in FIG. 5, the sintered body has the relative density of not lower than 90% by volume and the conductivity of not lower than $1 \times 10^{-4}$ (S/cm) in a range of the amount of hydrogen a of 0<a≤1.85 or more preferably in a range of 0.5≤a≤1.85.

The hydrogen-substituted garnet-type oxide, the manufacturing method of the sintered body and the manufacturing method of the hydrogen-substituted garnet-type oxide of the present disclosure are not limited to the aspects or the embodiments described above but may be implemented by any of various other aspects within the scope of the present disclosure.

TABLE 1

Industrial Applicability
The aspects of the present disclosure are applicable in the technical field using substances conducting Li ion, for example, in the technical field of battery industries.

| | SUBSTITUTION AMOUNT OF H a[1] (mol/unit) | HALF-HEIGHT WIDTH OF 421-DIFFRACTION PEAK (°) | CONDUCTIVITY (S/cm) | RELATIVE DENSITY (%) |
|---|---|---|---|---|
| EXPERIMENTAL EX 1 | 0 | 0.093 | $1.52 \times 10^{-4}$ | 75.5 |
| EXPERIMENTAL EX 2 | 0.7 | 0.113 | $5.75 \times 10^{-4}$ | |
| EXPERIMENTAL EX 3 | 0.913 | 0.115 | $3.80 \times 10^{-4}$ | 93.5 |
| EXPERIMENTAL EX 4 | 1.002 | 0.167 | $8.70 \times 10^{-5}$ | |
| EXPERIMENTAL EX 5 | 1.013 | 0.123 | $4.27 \times 10^{-4}$ | |
| EXPERIMENTAL EX 6 | 1.039 | 0.129 | $3.60 \times 10^{-4}$ | |
| EXPERIMENTAL EX 7 | 1.045 | 0.113 | $3.81 \times 10^{-4}$ | 93.8 |
| EXPERIMENTAL EX 8 | 1.148 | 0.153 | $2.76 \times 10^{-4}$ | |
| EXPERIMENTAL EX 9 | 1.202 | 0.123 | $4.69 \times 10^{-4}$ | 92.5 |
| EXPERIMENTAL EX 10 | 1.491 | 0.166 | $7.30 \times 10^{-5}$ | |
| EXPERIMENTAL EX 11 | 1.494 | 0.141 | $2.72 \times 10^{-4}$ | |
| EXPERIMENTAL EX 12 | 1.556 | 0.153 | $2.67 \times 10^{-4}$ | |
| EXPERIMENTAL EX 13 | 1.603 | 0.255 | $2.32 \times 10^{-5}$ | |
| EXPERIMENTAL EX 14 | 1.604 | 0.162 | $6.17 \times 10^{-5}$ | |
| EXPERIMENTAL EX 15 | 1.654 | 0.169 | $4.93 \times 10^{-5}$ | |
| EXPERIMENTAL EX 16 | 1.680 | 0.177 | $6.32 \times 10^{-5}$ | |
| EXPERIMENTAL EX 17 | 1.711 | 0.143 | $2.69 \times 10^{-4}$ | 91.4 |
| EXPERIMENTAL EX 18 | 1.722 | 0.198 | $2.90 \times 10^{-5}$ | |
| EXPERIMENTAL EX 19 | 1.764 | 0.190 | $1.16 \times 10^{-5}$ | |
| EXPERIMENTAL EX 20 | 1.829 | 0.150 | $2.15 \times 10^{-4}$ | |
| EXPERIMENTAL EX 21 | 1.866 | 0.192 | $5.04 \times 10^{-5}$ | 91.3 |
| EXPERIMENTAL EX 22 | 2.118 | 0.203 | $3.23 \times 10^{-5}$ | 91.2 |
| EXPERIMENTAL EX 23 | 2.129 | 0.173 | $4.88 \times 10^{-5}$ | |
| EXPERIMENTAL EX 24 | 2.130 | 0.203 | $7.79 \times 10^{-5}$ | |
| EXPERIMENTAL EX 25 | 2.327 | 0.173 | $4.88 \times 10^{-5}$ | |
| EXPERIMENTAL EX 26 | 2.773 | 0.232 | $4.11 \times 10^{-5}$ | 90.5 |

[1] a value of 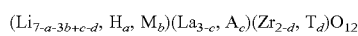 $(Li_{7-a-3b+c-d}, H_a, M_b)(La_{3-c}, A_c)(Zr_{2-d}, T_d)O_{12}$

What is claimed is:

1. A hydrogen-substituted garnet-type oxide, containing at least Li, H, La and Zr and having an amount of hydrogen a (mol/unit) per one unit of a garnet-type oxide in a range of 0<a≤1.85, and
the hydrogen-substituted garnet-type oxide being expressed by an elemental composition:

$(Li_{7-a-3b+c-d}, H_a, M_b)(La_{3-c}, A_c)(Zr_{2-d}, T_d)O_{12}$ where
M denotes one or more elements out of Al, Ga and Fe;
A denotes one or more elements out of Ca and Sr; and
T denotes one or more elements out of Nb and Ta, wherein the amount of hydrogen a (mol/unit) per one unit of the garnet-type oxide is in the range of 0<a≤1.85, 0≤b≤0.22, 0.05≤c≤1.0, and 0≤d≤0.6.

2. The hydrogen-substituted garnet-type oxide according to claim 1,
wherein the element M is Al, the element A is Ca and the element T is Nb.

3. The hydrogen-substituted garnet-type oxide according to claim 1,
wherein the amount of hydrogen a (mol/unit) is in a range of 0.5≤a.

4. A manufacturing method of a sintered body including a garnet-type oxide,
the manufacturing method of the sintered body comprising;
a molding process of mixing a hydrogen-substituted garnet-type oxide with a Li compound having an equivalent amount of Li to an amount of hydrogen included in the hydrogen-substituted garnet-type oxide to obtain a mixture and molding the mixture to form a molded body; and
a sintering process of sintering the molded body in a temperature range of not lower than 800° C. and not higher than 1200° C., so as to provide a sintered body including a garnet-type oxide that has a half-height width of not larger than 0.17 degrees with regard to 421-diffraction having a peak in a 2θ range of not smaller than 30.5 degrees and not larger than 31.0 degrees in X-ray diffraction analysis; wherein
the hydrogen-substituted garnet-type oxide contains at least Li, H, La and Zr and has an amount of hydrogen a (mol/unit) per one unit of a garnet-type oxide in a range of 0<a≤1.85, and
the hydrogen-substituted garnet-type oxide is expressed by an elemental composition:

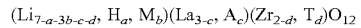 $(Li_{7-a-3b-c-d}, H_a, M_b)(La_{3-c}, A_c)(Zr_{2-d}, T_d)O_{12}$ where
M denotes one or more elements out of Al, Ga and Fe,
A denotes one or more elements out of Ca and Sr, and
T denotes one or more elements out of Nb and Ta, wherein the amount of hydrogen a (mol/unit) per one unit of the garnet-type oxide is in the range of $0 < a \leq 1.85$, $0 \leq b \leq 0.22$, $0.05 \leq c \leq 1.0$, and $0 \leq d \leq 0.6$.

5. The manufacturing method of the sintered body according to claim 4,
wherein the sintered body includes the garnet-type oxide and has the half-height width of 421-diffraction in a range of not smaller than 0.08 degrees and not larger than 0.16 degrees.

6. The manufacturing method of the sintered body according to claim 4,
wherein the sintered body has a relative density of not lower than 90%.

7. The manufacturing method of the sintered body according to claim 4,
wherein the sintered body has a conductivity of not lower than $1.0 \times 10^{-4}$ (S/cm) at 25° C.

8. A manufacturing method of a hydrogen-substituted garnet-type oxide, comprising:
a firing process including at least a first process that uses and mixes a raw material including at least a Li compound, a La compound and a Zr compound and fires the mixed raw material in a temperature range of not lower than 650° C. and not higher than 900° C. to obtain a fired powdery substance; and a second process that adds and mixes, as appropriate, a Li compound to and with the obtained fired powdery substance to obtain a mixture and fires the mixture in a temperature range of not lower than 650° C. and not higher than 900° C. to obtain a fired powdery substance; and a hydrogen substitution process of causing the fired powdery substance obtained by the firing process to be immersed in a hydrogen-containing liquid for substitution of Li with H, so as to obtain the hydrogen-substituted garnet-type oxide according to claim 1.

9. The hydrogen-substituted garnet-type oxide according to claim 1, wherein the amount of hydrogen a (mol/unit) per one unit of the garnet-type oxide is in the range of $0.7 \leq a \leq 1.202$.

* * * * *